US006402851B1

(12) United States Patent
Piltingsrud

(10) Patent No.: US 6,402,851 B1
(45) Date of Patent: Jun. 11, 2002

(54) LANTHANIDE OXIDE DISSOLUTION FROM GLASS SURFACE

(75) Inventor: Douglas Howard Piltingsrud, Eyota, MN (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 09/590,667

(22) Filed: Jun. 8, 2000

Related U.S. Application Data

(63) Continuation-in-part of application No. 09/574,976, filed on May 19, 2000, now abandoned.

(51) Int. Cl.[7] .................................................. C23G 1/02
(52) U.S. Cl. .......................... 134/1; 510/165; 510/175; 510/477; 510/488; 510/480; 510/367; 510/368; 134/2; 134/3; 134/6; 134/19; 134/26; 134/28; 134/29; 134/34; 134/35; 134/36; 134/41; 134/42; 134/902; 451/37; 451/57; 451/441; 15/77; 15/88; 15/97.1; 15/102
(58) Field of Search ................................ 510/165, 175, 510/477, 488, 367, 368, 480; 134/1, 2, 3, 6, 19, 26, 28, 29, 34, 35, 36, 41, 42, 902; 451/37, 57, 441; 15/88, 77, 97.1, 102

(56) References Cited

U.S. PATENT DOCUMENTS

| | | | | |
|---|---|---|---|---|
| 3,429,080 A | * | 2/1969 | Lachapelle et al. | 106/3 |
| 5,622,904 A | | 4/1997 | Ohkubo et al. | 501/53 |
| 5,772,780 A | * | 6/1998 | Homma et al. | 134/28 |
| 6,043,155 A | * | 3/2000 | Homma et al. | 134/1.3 |
| 6,162,565 A | * | 12/2000 | Chao et al. | 134/28 |
| 6,332,831 B1 | * | 12/2001 | Shemo et al. | 451/41 |

FOREIGN PATENT DOCUMENTS

SA      816983    *   3/1981

* cited by examiner

Primary Examiner—Sharidan Carrillo
(74) Attorney, Agent, or Firm—Kristi L. Davidson; Wood, Herron & Evans

(57) ABSTRACT

A method and product for computer disk drives. Glass substrates are provided having low content of residual polishing particles on the surfaces thereof. An exemplary method includes reduction of residual polishing particle content by immersion of the glass substrate in an acid bath containing nitric acid, hydrogen peroxide and an organic acid having a carboxylic acid group.

49 Claims, 2 Drawing Sheets

LANTHANIDE OXIDE DISSOLUTION FROM GLASS SURFACE

CROSS-REFERENCE TO RELATED APPLICATION

This application is a continuation-in-part of U.S. patent application Ser. No. 09/574,976 filed by Douglas Howard Piltingsrud on May 19, 2000, now abandoned, which application is incorporation by reference herein.

FIELD OF THE INVENTION

This invention relates to disk drive data storage devices, and more particularly to the manufacture of glass substrates used in disk drive data storage devices.

BACKGROUND OF THE INVENTION

Disk drives for computers store data on a magnetic substance coated on a substrate. The substrates have previously been based upon aluminum, such as AlMg/NiP substrates, which are polished to a smooth finish with an alumina slurry or alumina and silica slurries prior to sputtering with thin film magnetic coatings. The alumina and silica slurries are cleaned from the substrate by the general cleaning mechanisms of mechanical scrubbing, dispersion and etching. Surfactants and pH are generally used for dispersion cleaning, where the surfactant and pH act to separate the slurry particles from each other and from the substrate. Etching is generally accomplished by acids and acid soaps that erode or dissolve the substrate material beneath embedded slurry particles (under-cut) to release them from the substrate. Typical acids in use for NiP plated Al-base substrates include, for example, straight phosphoric acid, nitric acid, hydrofluoric acid-based soaps and phosphoric acid-based soaps. The straight acids generally have a pH less than 1 and the soaps generally have pH's above 1.

After cleaning, the substrates are sputtered with a series of layers, for example a chrome underlayer, a magnetic layer and a carbon protection layer. If residual alumina particles are left on the substrate, the sputtered layers replicate the irregular surface morphology, creating a bumpy surface on the finished disk. When the head glides over the surface, it crashes into the bumps created by the residual particles that are higher than the glide clearance. This is known as a glide defect, which can ultimately cause file failure. These bumps further cause mag defects, corrosion and decreased disk life. Thus, the residual slurry particles need to be removed from the polished substrate surface so that the substrate is as smooth as possible.

More recently, glass substrates have been used for disk drives in laptop computers. Glass substrates have a higher impact or dent resistance than the aluminum-based substrates, which is important in portable computers where the unit is subject to being bumped, dropped and banged around, causing the head to bang on the disk substrate surface. An additional benefit of glass is that it may be polished to a smoother surface finish than aluminum-based substrates. A smoother substrate allows the head to fly closer to the disk, which produces a higher density recording. Glide height for some computer disk drive files is on the order of 20 nanometers (about 200 Å) and less, which is an extremely small interface distance. Thus, the fact that glass substrates can be polished to smoother finishes makes an industry shift from Al-based to glass substrates desirable, not only for laptop units, but for desktop units as well.

Just as with the aluminum-based substrates, the surfaces of the glass substrate needs to be polished with a slurry to an atomically smooth surface prior to sputtering. It is to be understood that the substrates are relatively thin disks having a top surface and bottom surface, or a Side A and Side B, each of which are polished to a smooth finish. For this polishing process, an aqueous slurry of lanthanide oxides is applied to the substrate. Lanthanide oxides is understood to include oxides of one or more of the rare earth elements of the lanthanide series according to the Periodic Table of Elements, which includes elements 57–71. The lanthanide oxide slurries will typically comprise a major proportion of lanthanum and cerium particles. These slurry particles must subsequently be cleaned off, and this generally is accomplished in a series of steps, including ultrasonic cleaning and mechanical scrubbing (typically referred to as Oliver scrub cleaning) with soap and a pad to remove the loosest slurry.

After these cleaning processes, particles on the order of <0.1 $\mu$m (100 nanometers) up to about 1 $\mu$m (1,000 nanometers) still remain on the surfaces of the glass substrate. These particles are not easily removed from the substrate, as they are held to the surface by both van der Waals forces, which are very significant at these particle sizes, hydrogen bonding, and molecular bonding of the particles to the surface. Just as with the alumina particles, if these lanthanide oxide particles are left in place on the disk substrate, large glide yield losses and disk corrosion occur in the disk hard file containing the glass substrate, resulting in increased manufacturing costs and customer hard drive failures.

An apparent solution would be the use of acid or base solutions to etch the disk or under-cut the particles similar to that which is done to remove alumina particles from NiP plated aluminum-base substrates. The surface finish of a glass substrate, however, can be damaged by such a method due to low resistance of the glass material to acid etching or overly aggressive acid solutions, such as hydrofluoric acid and caustic etching at high pH's and temperatures. Damage and compositional change to the polished glass surface will adversely affect the morphology of layers deposited by subsequent sputtering processes and can cause magnetic, glide and corrosion failures. Dissolving off the slurry particles, however, would not be affected by small particle size or molecular bonding in a negative way as using dispersing for cleaning, or necessarily cause surface damage. But dissolving off lanthanide oxides from a glass surface is not easily accomplished, as lanthanide oxides resist dissolution by many acids. Glass substrates currently available, such as those used in laptop computer disk drives, have very high particle values for both Ce and La, which are left from the polishing slurry. For example, some currently available 95 mm aluminosilicate glass substrates contain on the order of 7–58 nanograms (ng) cerium oxide and 15–102 ng lanthanum oxide per substrate. It has been discovered that low Ce and La particle values are critical for low glide heights ($\leq$20 nm currently) and near contact recording, so the currently high particle values are unacceptable. It has also been discovered that these particles are a major factor in glide failures where bumps from particles result in removal of the protective carbon layer and subsequently spot corrosion. Thus, lanthanide oxide particle levels must be kept low on glass substrates to achieve the corrosion resistance and smooth surface necessary for use of glass substrates in computer disk drives.

If the market trend toward glass substrates in computer disk drives is to succeed, a cleaning method other than the known acid or base etching techniques is required for removing residual lanthanide oxide particles from the slurry polish that adhere to the surfaces of the glass substrates without altering the polish finish or surface stability to corrosion.

SUMMARY OF THE INVENTION

The invention addresses these and other problems associated with the prior art by providing a method for cleaning glass substrates that have been polished with lanthanide oxide slurries.

In an exemplary embodiment, glass substrates which have been polished with lanthanide oxide slurries are cleaned after polishing by immersion in an acid bath of nitric acid, hydrogen peroxide and an organic acid having a carboxylic acid group. The glass substrate may also be further subjected to PVA scrubbing in a basic solution of pH between about 9 and about 12 and immersion in a basic bath of potassium hydroxide of pH between about 11.5 and about 13. In an exemplary embodiment, a glass substrate has polished surfaces with less than about $1.52 \times 10^{-4}$ ng/mm$^2$ each of oxide particles of lanthanide series elements. A glass substrate may be produced by the method described above without significantly changing the Al to Si ion surface composition. A disk drive product is also provided comprising a glass substrate having polished surfaces with less than about $1.52 \times 10^{-4}$ ng/mm$^2$ each of oxide particles of lanthanide series elements.

These and other advantages and features, which characterize the invention, are set forth in the claims annexed hereto and forming a further part hereof. However, for a better understanding of the invention, and of the advantages and objectives attained through its use, reference should be made to the accompanying Detailed Description, in which there is described exemplary embodiments of the invention.

DETAILED DESCRIPTION

Figure 1:
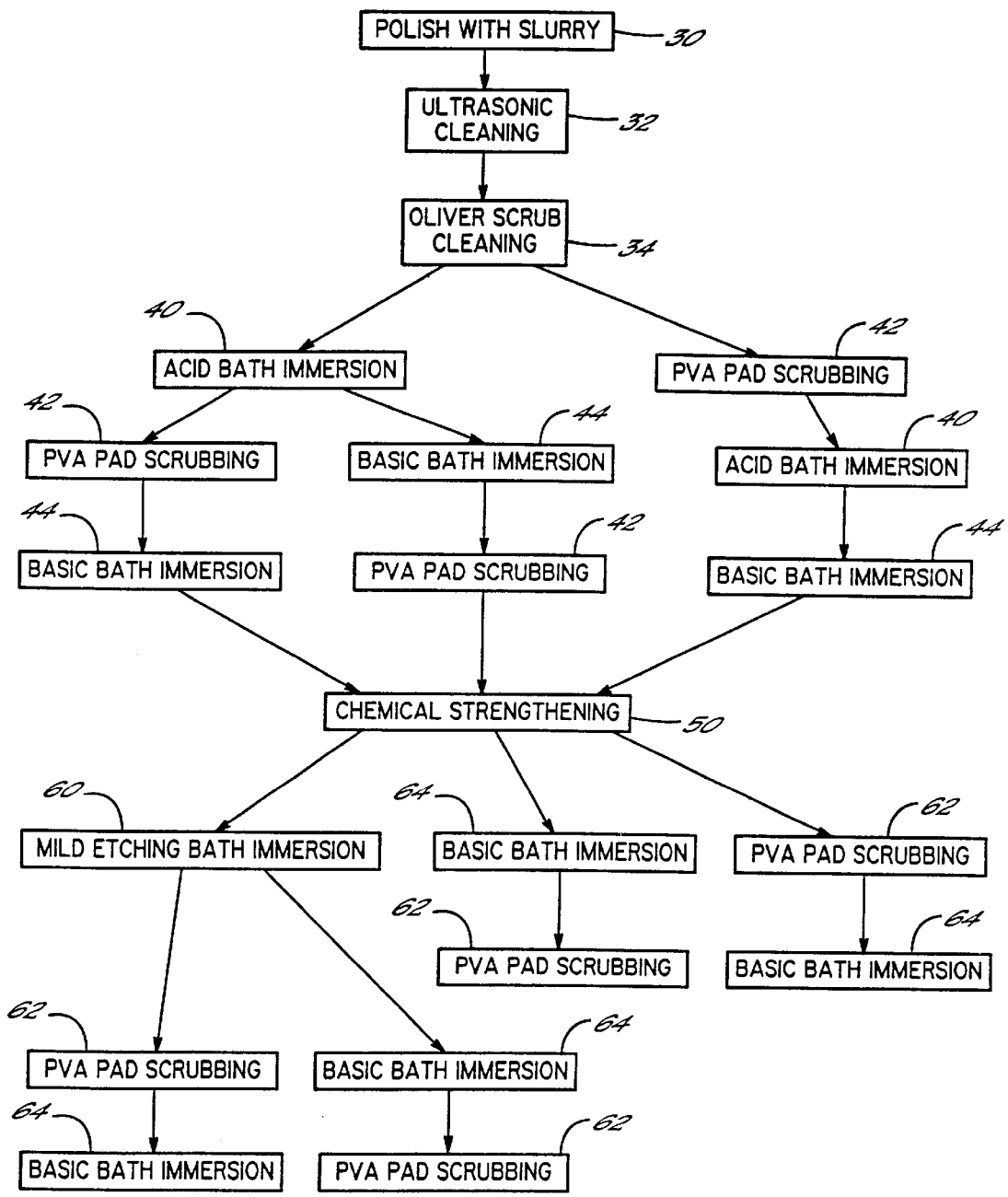
FIG. 1 is a flow diagram of cleaning methods consistent with the invention.

Glass substrates for computer disk drives must be polished to an atomically smooth finish. To this end, the surfaces of the glass substrate are polished with a lanthanide oxide slurry. Typically, the substrate is ultrasonically cleaned with soap after coming off the polisher to remove the bulk of the lanthanide oxide polishing material, and then the substrate is mechanically scrubbed (Oliver scrub cleaning) using soap and a pad to further remove large amounts of the lanthanide oxide polishing material. Residual polish slurry left at this point greatly resists removal by mechanical and dispersion mechanisms because it is molecularly bonded to the surface or has high Van der Waals and hydrogen bonding forces holding it to the surface because of particle-to-surface compliance caused by polishing or it receives little mechanical force to get it off the surface because of its small size. Dissolving these slurry particles will break the molecular bonding, the surface compliance, and size factors similarly to under-cutting, but without the surface-altering etch. In accordance with the principles of the present invention, the residual lanthanide oxide particles are removed by immersing the substrate in an acid bath of nitric acid, hydrogen peroxide and an organic acid having a carboxylic acid group. Subsequently, as is typical in the industry, the substrate is also PVA (polyvinyl alcohol) pad scrubbed with a basic soap solution. Advantageously, the substrate is further immersed in a basic bath of potassium hydroxide.

After these cleaning steps, the substrate is subjected to chemical strengthening. Chemical strengthening is known in the art for treating glass, and per se forms no part of the present invention. In chemical strengthening, the substrate is immersed in molten potassium and/or sodium nitrate for anywhere from 1 to 8 hours to strengthen the glass against breaking.

An additional cleaning process is performed after chemical strengthening. This final cleaning process after chemical strengthening typically includes: (a) a mild etching bath of pH less than about 3 and comprising sulfuric acid or an organic acid, such as tartaric acid, citric acid, lactic acid, gluconic acid or edetic acid, plus a surfactant, or comprising nitric acid, boric acid, hydrogen peroxide and an organic acid; (b) a PVA scrub in a basic solution having a pH of about 9 to about 12; (c) and immersion in a basic bath of potassium hydroxide of pH between about 11.5 and about 13. The chemical strengthening and final cleaning may further remove some of the lanthanide oxide particles. The result of the acid bath cleaning, PVA scrub and basic bath cleaning before and after chemical strengthening is a glass substrate having polished surfaces with less than about $1.52 \times 10^{-4}$ ng/mm$^2$ each of oxide particles of lanthanide series elements and a surface composition of Al and Si ions relatively unchanged. Aluminum silicate-based glasses are currently preferred for computer disk drives, but the method of the present invention is applicable to glasses in general.

With respect to the nitric acid bath used in the method of the present invention, the bath comprises nitric acid, hydrogen peroxide and an organic acid. An exemplary acid bath solution of the present invention contains at least about 1N nitric acid, and advantageously about 3N to about 4N nitric acid. The nitric acid has been found useful in dissolving cerium oxide and lanthanum oxide particles in particular, and all lanthanide oxide particles in general. Concentrations of nitric acid lower than about 1N may be used in the method of the present invention, with the disadvantages being a slower rate of removal of the residual particles and less total removal. Raising the temperature of the bath will compensate for the disadvantages 100% or less depending on the acid concentration. Concentrations of nitric acid higher than about 4N and higher temperatures may also be used within the scope of the present invention, however, safety and cost issues may make it prohibitive in the production environment.

In an exemplary nitric acid bath solution of the present invention, hydrogen peroxide is present in the acid bath at a concentration of at least about 0.15N. Hydrogen peroxide acts as a rate accelerator or activator. The peroxide acts as a reducing agent and helps break up the lanthanide oxide lattices and together with the nitric acid works to achieve a faster rate for dissolving the residual particles off the surface of the glass substrate. This allows for a lower bath temperature thereby reducing safety and equipment cost issues. The present invention contemplates acid baths containing about 0.15N to about 1N hydrogen peroxide. Higher concentrations of hydrogen peroxide may be used within the scope of the present invention, but eventually no improvement in residual particle removal will be obtained by the higher concentrations.

An exemplary nitric acid bath solution of the present invention further includes an organic acid having an active carboxylic acid group. Exemplary organic acids include tartaric acid, citric acid, lactic acid, gluconic acid and edetic acid (EDTA). The nitric acid bath includes the organic acid at a concentration of at least about 0.0067M, and advantageously about 0.02M to about 0.04M. The acid bath advantageously includes at least about 0.0067M tartaric acid (HOOC(CH$_2$O)$_2$COOH). The tartaric acid acts as a surfactant to aid in surface wetting and particle dispersion for increased rate of removal of the residual particles. The tartaric acid further acts to dissolve iron, which may be present as a contaminant from the equipment or environment. Tartaric acid is also compatible with waste treatment processing. Advantageously, the tartaric acid is present at a concentration of about 0.02 to about 0.04M. Higher concentrations may be used within the scope of the present invention, but eventually the increased tartaric acid concentration will cease to provide additional improved results in the lanthanide oxide removal.

An exemplary nitric acid bath of the present invention comprises at least about 1N nitric acid, and advantageously about 3N to about 4N nitric acid; at least about 0.15N hydrogen peroxide, and advantageously about 0.5N to about 1N hydrogen peroxide; and at least about 0.0067M organic acid, and advantageously about 0.02 to about 0.04M organic acid. An acid bath of this exemplary concentration will have a pH of less than 0 because the solution is more than a 1 normal solution in a fully dissociated acid. The acid bath is advantageously maintained at a temperature of at least about 40° C. At lower temperatures, the acid bath may not be aggressive enough to get high percentages of lanthanide oxide residual particles off the substrate surfaces, at least not at a workable rate of removal. A preferred temperature range for the acid bath is about 55° C. to about 70° C. Although higher acid bath temperatures will work within the scope of the present invention, manufacturing equipment safety issues may develop at the higher temperatures. For the exemplary acid bath described above, a suitable operating temperature is about 70° C.

In addition to the three components of the nitric acid bath described above, additional components may be added while remaining within the scope of the present invention. For example, the acid bath may further include a surfactant in an amount of about 0.03 vol. % to about 0.15 vol. %, and advantageously about 0.1 vol. %. Some surfactants in an acid media bond to the surfaces of the glass substrate to help protect the polished surfaces and reduce the amount of etching that may occur. Further, a surfactant helps aid in the wetting and particle dispersion for dissolving the particles off the surfaces. One type of surfactant that may be added to the acid bath of the present invention is CorAdd™ of the Coral Chemical Company (Paramount, Calif.). CorAdd™ is a proprietary compound of Coral Chemical, but is believed to be an ethoxylated alcohol. There are numerous other commercial surfactants available, many of which are believed to work as an optional additive in the acid bath of the present invention.

The nitric acid bath may further include the optional component of aluminum ions, for example up to about 0.02N $Al(NO_3)_3 \cdot 9H_2O$ and advantageously about 0.005N $Al(NO_3)_3 \cdot 9H_2O$. Because acids tend to remove aluminum ions in aluminosilicate glasses, the addition of aluminum nitrate in the bath helps preserve the surface glass composition. Additionally, the aluminum nitrate may help make a small incremental reduction in the final lanthanum oxide level achieved.

The nitric acid bath may further include the optional component of sulfuric acid at a concentration up to about 1N. Sulfuric acid protects against iron contamination in much the same way as tartaric acid and aids in dissolving lanthanide oxides. Concentrations above 1N could be used, but are not believed likely to provide enhanced performance. Also, sulfuric acid even at 1N will likely damage the equipment and is a safety hazard, and thus if included, sulfuric acid is advantageously present in lower concentrations.

The nitric acid bath of the present invention may further include the optional component of boric acid ($H_3BO_3$) in an amount up to about 40 g/l and advantageously about 10 g/l to about 40 g/l. The boric acid acts as a surface protectant after chemical strengthening to reduce surface etching, and further acts as a fluoride scavenger. The boric acid is preferably present as a saturated boric acid solution.

In the method of the present invention, the glass substrate is immersed in the nitric acid bath for a time sufficient to dissolve, and/or loosen lanthanide oxide residual particles such that a content of less than about $1.52 \times 10^{-4}$ ng/mm$^2$ for each type of lanthanide oxide particle may be obtained on the surfaces of the final cleaned product. By way of example only, a glass substrate having a diameter of 95 mm cleaned in accordance with the method of the present invention will have a total content measured on the surfaces of both sides of the substrate of less than about 2 ng for each type of lanthanide oxide particle, or less than about 1 ng for a single side of the disk. The slurry used for polishing the glass substrates may contain one or more oxides of lanthanide series elements, with the major proportion of the oxide slurries generally comprising lanthanum oxide and cerium oxide. Thus, the nitric acid bath in combination with subsequent cleaning processes reduces the lanthanum content to less than about $1.52 \times 10^{-4}$ ng/mm$^2$ and the ceriuim content to less than about $1.52 \times 10^{-4}$ ng/mm$^2$ and any other lanthanide oxide to less than about $1.52 \times 10^{-4}$ ng/mm$^2$ on the surfaces of the final product. The amount of time necessary for reducing the residual oxide particle content is dependent upon the temperature, composition and concentration of the nitric acid bath. For a 70° C. acid bath having an exemplary composition as discussed above of at least about 3N nitric acid, at least about 0.1 5N hydrogen peroxide and at least about 0.0067M tartaric acid, the optimal immersion time in the acid bath is at least about 4 minutes, preferably about 4 to about 5 minutes, and most preferably about 4.5 minutes. Lower temperatures will require longer immersion times. Likewise, lower component concentrations for the acid bath may increase the amount of time necessary for removing or loosening the residual particles. An advantage of the present invention is that the glass substrate does not suffer etching from the pre-chemical strengthening nitric acid bath, regardless of higher temperatures and longer immersion times. The acid bath removes and/or loosens the residual particles without damaging the polished surfaces, allowing the glass substrate to be used in disk drives in portable and desktop computers.

After dissolving and loosening residual slurry particles from the substrate surfaces utilizing the nitric acid bath of the present invention, the substrates may be further subjected to a PVA pad scrub using potassium hydroxide. The potassium hydroxide may have a pH of about 9 to about 12, and advantageously about 10 to about 10.5. This cleaning process is also believed to remove some residual lanthanide oxide particles, including particles loosened from the surface by the acid bath of the present invention. Typically, the substrates are water rinsed between acid bath immersion and PVA scrubbing. It is to be understood that suitable alternatives to PVA and potassium hydroxide may be used for the scrub cleaning without departing from the scope of the present invention. In a further alternative, the PVA pad scrubbing may be performed prior to the nitric acid bath immersion.

The glass substrate may be further immersed in a basic bath after the acid bath immersion and PVA scrub. For example, a potassium hydroxide bath restores the surface glass substrate composition. An exemplary basic bath has a pH of about 11.5 to about 13, and advantageously about 12.5, and a temperature of about 40° C. to about 70° C., and advantageously about 70° C. Longer times and higher temperatures may be used, although higher temperatures may cause safety issues. Temperature and pH selection are also dependent upon glass composition, as may be appreciated by one skilled in the art. This caustic bath also may be effective to remove lanthanide oxide particles not removed by the previous cleaning. In a further alternative, the basic bath immersion may be performed prior to the PVA scrub.

The nitric acid bath, PVA scrub and basic bath described above are all performed prior to chemical strengthening. After chemical strengthening, the substrate receives a final cleaning similar to the acid bath/PVA scrub/basic bath pre-chemical strengthening cleaning process, excerpt that the acid bath is a mild etching bath comprising boric acid in addition to the same components in the nitric acid bath, or comprising an organic or sulfuric acid and a surfactant. More specifically, the mild etching bath may comprise an organic acid, advantageously tartaric acid, or sulfuric acid of pH less than about 3 and about 0.03 vol. % to about 0.15 vol. %, and advantageously about 0.1 vol. % of CorAdd™ or other effective surfactant. Alternatively, the mild etching bath may comprise at least about 1N nitric acid, and advantageously about 3N to about 4N nitric acid; up to about 40 g/l boric acid and advantageously about 10 g/l to about 40 g/l boric acid; at least about 0.15N hydrogen peroxide, and advantageously about 0.5N to about 1N hydrogen peroxide; and at least about 0.0067M organic acid, and advantageously about 0.02 to about 0.04M organic acid. The other exception is that the temperature may be lower for the potassium hydroxide basic bath, for example, being in the 40–60° C. range as dictated by the desired Al to Si surface composition. Glass composition may affect choice of temperature, pH and times needed to obtain the desired final surface composition, as will be apparent to one skilled in the art. As with the pre-chemical strengthening cleaning process, the order of the PVA pad scrubbing and basic bath immersion may be varied. In a further alternative, the mild etching bath immersion may be omitted, and the glass substrate subjected to a basic bath immersion and PVA scrubbing, in either order, particularly where the nitric acid bath immersion prior to chemical strengthening includes sulfuric acid.

EXAMPLES

Example 1

A 95 mm aluminosilicate disk was polished with a lanthanide oxide slurry. After polishing, the disk was ultrasonically cleaned, then Oliver scrub cleaned. The disk was then subjected to a pre-chemical strengthening cleaning comprising: (a) nitric acid bath immersion with ultrasonics at 65° C. to 70° C. for 4.5 min. in a solution of 3N nitric acid, 1N hydrogen peroxide, 0.02M tartaric acid, 0.005N aluminum nitrate, and 0.1 vol. % CorAdd™ surfactant; (b) deionized water rinsing with ultrasonics; (c) PVA pad scrubbing for 0.1 to 0.4 min. with a basic solution of pH 10.0 to 10.5; (d) basic bath immersion at pH 12.3 to 12.7 with ultrasonics for 4.5 min. at 65° C. to 70° C.; (e) deionized water rinsing with ultrasonics; and (f) spin drying. Ultrasonics as referred to herein refers to mixing by introducing a frequency of about 40–72 kHz to the bath solution or water rinse to produce cavitation (i.e. imploding bubbles). After chemical strengthening, the dish was given a final cleaning comprising: (a) mild etching bath immersion with ultrasonics at 50° C. to 55° C. for 2.25 min. in a solution of 0.01M tartaric acid and 0.1 vol. % CorAdd™ surfactant; (b) deionized water rinsing with ultrasonics; (c) PVA pad scrubbing for 0.1 to 0.4 min. with a basic solution of pH 10.0 to 10.5; (d) basic bath immersion at pH 12.3 to 12.7 with ultrasonics for 4.5 min. at 55° C. to 60° C.; (e) deionized water rinsing with ultrasonics; and (f) spin drying. The Ce and La concentrations were measured by ICP (Inductively Coupled Plasma) at several stages in the process and are provided in Table 1. Substrate glass surface composition of Al to Si as measured by SIMS (Secondary Ion Mass Spectrometry) was 1:1 versus 1.2–1.6:1 for the original glass and 0.01–0.4:1 for glass after contact with acidic solutions.

TABLE 1

| Process Sample Point | Average Ce (ng)/95 mm disk | % Ce left on disk | Average La (ng)/95 mm disk | % La left on disk |
|---|---|---|---|---|
| After Slurry Polish | 1012 | 100.0 | 3260 | 100.0 |
| After Ultrasonic Cleaning | 384 | 38.0 | 1918 | 59.0 |
| After Oliver Scrub Cleaning | 117 | 12.0 | 747 | 23.0 |
| After Nitric Acid Bath Immersion | 37 | 3.7 | 357 | 11.0 |
| After Pre-Chemical Strengthening Cleaning | 17 | 1.7 | 162 | 5.0 |
| After Mild Etching Bath Immersion | 4.6 | 0.46 | 11.1 | 0.34 |
| After Final Cleaning | 1.1 ± 0.4[1] | 0.11 | 1.8 ± 0.6[1] | 0.06 |

[1]Measurement and standard deviation based upon an average of 20 samples.

Example 2

A 95 mm aluminosilicate disk was polished with a lanthanide oxide slurry. After polishing, the disk was ultrasonically cleaned then Oliver scrub cleaned. The disk was then subjected to a pre-chemical strengthening cleaning comprising: (a) nitric acid bath immersion with ultrasonics at 65° C. to 70° C. for 4.5 min. in a solution of 3N nitric acid, 1N sulfuric acid, 1N hydrogen peroxide, 0.02M tartaric acid, 0.005N aluminum nitrate, and 0.1 vol. % CorAdd™ surfactant; (b) deionized water rinsing with ultrasonics; (c) basic bath immersion at pH 12.3 to 12.7 with ultrasonics for 4.5 min. at 65° C. to 70° C.; (d) deionized water rinsing with ultrasonics; (e) PVA pad scrubbing for 0.1 min. with a basic solution of pH 10.0 to 10.5; (f) deionized water rinsing with ultrasonics; and (g) spin drying. After chemical strengthening, the disk was given a final or post chemical strengthening clean comprising: (a) deionized water rinsing; (b) basic bath immersion at pH 12.3 to 12.7 with ultrasonics for 4.5 min. at 55° C. to 60° C.; (c) deionized water rinsing with ultrasonics; (d) PVA pad scrubbing for 0.1 min. with a basic solution of pH 10.0 to 10.5; (e) deionized water rinsing; and (f) spin drying. Final Ce and La concentrations by ICP were 1.1+/−0.3 and 1.4+/−0.4, respectively, based upon an average of 19 samples. Substrate glass surface composition of Al to Si as measured by SIMS was 1:1 versus 1.2–1.6:1 for the original glass and 0.01–0.4:1 for glass after contact with acidic solutions.

After the easy-to-remove bulk slurry is taken off by the ultrasonic and Oliver scrub cleaning, the major cleaning step is the complex nitric acid bath, which removed 69% of the residual cerium oxide and 52% of the residual lanthanum oxide. The remaining steps contribute to removal of less than 27% of the residual slurry for any one step.

The nitric acid bath of the present invention contributed to a significant reduction in lanthanide oxide particles, and in combination with the various other cleaning processes, enables manufacture of a glass substrate with polished surfaces having less than an average of $1.52 \times 10^{-4}$ ng/mm$^2$ each of lanthanide oxide particles thereon. The mild etching bath of the present invention also contributes to a significant reduction in residual lanthanide oxide content.

Referring now to the Figures, FIG. 1 presents a flow chart for alternative cleaning methods within the scope of the present invention. In general, a glass substrate is first polished with a slurry (step 30), then ultrasonically cleaned (step 32), followed by an Oliver scrub cleaning (step 34). The glass substrate is then subjected to a pre-chemical strengthening cleaning process. This process may include a nitric acid bath immersion (step 40), then a PVA pad scrubbing (step 42), followed by a basic bath immersion (step 44). Alternatively, the acid bath immersion (step 40) may be followed by a basic bath immersion (step 44) and then PVA pad scrubbing (step 42). In a further alternative of the pre-chemical strengthening cleaning process, the process may include a PVA pad scrubbing (step 42), then an acid bath immersion (step 40), followed by a basic bath immersion (step 44). The glass substrate is next subjected to chemical strengthening (step 50), after which a final cleaning is performed. The final cleaning process may include a mild etching bath immersion (step 60), then a PVA pad scrubbing (step 62), followed by a basic bath immersion (step 64). Alternatively, the mild etching bath immersion (step 60) may be followed by a basic bath immersion (step 64) and then PVA pad scrubbing (step 62). In a further alternative of the final or post-chemical strengthening cleaning process, the process may include a PVA pad scrubbing (step 62) followed by a basic bath immersion (step 64), or a basic bath immersion (step 64) followed by a PVA pad scrubbing. It should be understood that further alternatives may exist, for example, a PVA pad scrub may be performed before and after acid and/or basic bath immersions.

Figure 2:
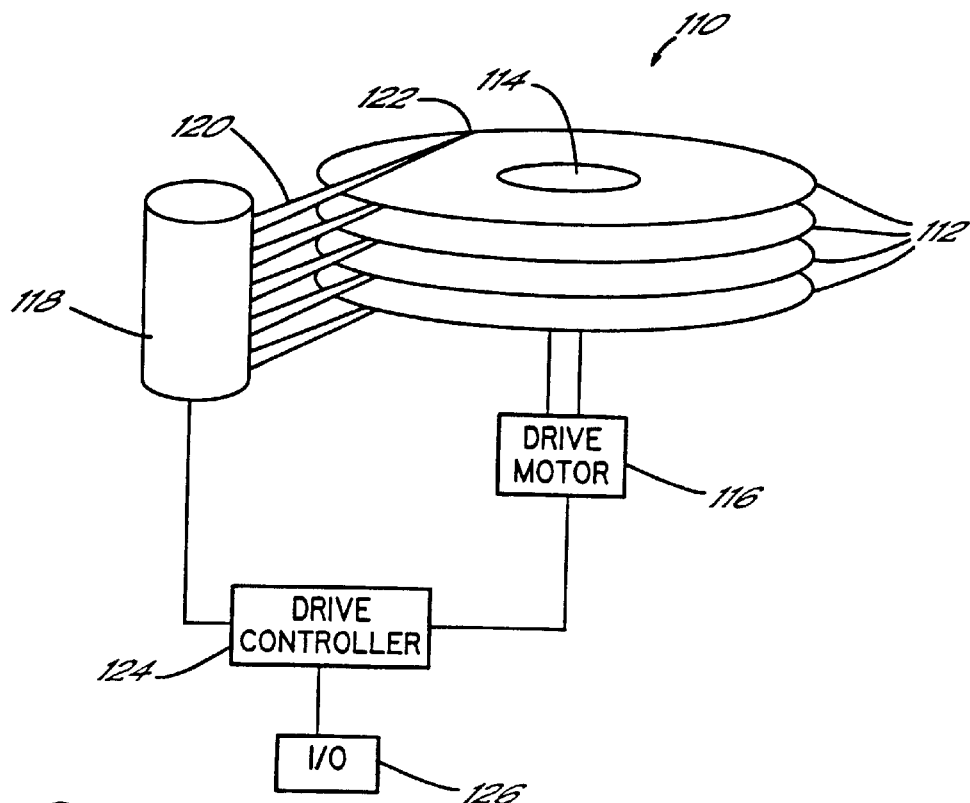
FIG. 2 is a functional block diagram of a disk drive consistent with the invention.

FIG. 2 illustrates an exemplary disk drive 110 incorporating a plurality of rigid data storage disks 112 stacked coaxially in a tandem spaced relationship and rotated about a hub 114 driven by a drive motor 116. Disk drive 110 may incorporate any number of disks 112, with one or more of the disks incorporating a glass substrate of the present invention.

An actuator 118 includes one or more outwardly extending actuator arms 120, with each arm having one or more transducer/heads 122 mounted thereto for writing and reading information to and from the rigid data storage disks 112. The actuator 118 and drive motor 114 are driven by a drive controller 124 which coordinates rotation of the disks, movement of the actuator, and the transfer of data to and from the disks. Additional electronic circuitry may also be coupled to controller 124, e.g., input/output circuitry 126 utilized to communicate data between the disks and a computer or other electronic device with which the disk drive is interfaced.

Disk drive 110 may incorporate any number of known disk drive technologies, and may be used in a wide variety of applications, e.g., in a direct access storage device (DASD) system, a RAID system, a desktop hard drive, a portable hard drive, a removable hard drive, etc. Therefore, the invention is not limited to the particular implementations described herein.

While the present invention has been illustrated by the description of an embodiment thereof, and while the embodiments has been described in considerable detail, it is not intended to restrict or in any way limit the scope of the appended claims to such detail. For example, while glass substrates for computer disk drives have been described herein, the acid bath of the present invention has application for any glass substrate polished with a lanthanide oxide slurry for any ultimate end use, such as laser or microscope optics. The present invention is not intended to be limited to glass substrates for computer disk drives. Other additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method for cleaning glass substrates after being polished with a slurry comprising lanthanide oxide particles, the method comprising the steps of:

polishing a glass substrate with a slurry comprising lanthanide oxide particles; and immersing the polished glass substrate having lanthanide oxide particles thereon in an acid bath comprising nitric acid, hydrogen peroxide and an organic acid having a carboxylic acid group, wherein the step of immersion substantially dissolves the lanthanide oxide particles from the polished glass substrate into the acid bath thereby reducing the content of the lanthanide oxide particles present on the polished glass substrate.

2. The method of claim 1, wherein the glass substrate is an aluminosilicate glass.

3. The method of claim 1, wherein the lanthanide oxide particles include at least one oxide of a lanthanum series element selected from the group consisting of: lanthanum, cerium, praseodymium, neodymium, promethium, samarium, europium, gadolinium, terbium, dysprosium, holmium, erbium, thulium, ytterbium and lutetium.

4. The method of claim 1, wherein the lanthanide oxide particles include at least one of lanthanum oxide and cerium oxide.

5. The method of claim 1, wherein the polished glass substrate is immersed in the acid bath at a temperature of at least about 40° C.

6. The method of claim 1, wherein the polished glass substrate is immersed in the acid bath at a temperature of about 55° C. to about 70° C.

7. The method of claim 1, wherein the nitric acid in the acid bath is at least about 1N nitric acid.

8. The method of claim 1, wherein the nitric acid in the acid bath is about 3N to about 4N nitric acid.

9. The method of claim 1, wherein the hydrogen peroxide in the acid bath is at least about 0.5N hydrogen peroxide.

10. The method of claim 1, wherein the hydrogen peroxide in the acid bath is about 0.15N to about 1N hydrogen peroxide.

11. The method of claim 1, wherein the organic acid is tartaric acid, citric acid, lactic acid, gluconic acid or edetic acid.

12. The method of claim 1, wherein the organic acid in the acid bath has a concentration of at least about 0.0067M.

13. The method of claim 1, wherein the organic acid in the acid bath has a concentration of about 0.02 to about 0.04M.

14. The method of claim 1, wherein the organic acid in the acid bath is tartaric acid having a concentration of at least about 0.0067M.

15. The method of claim 1, wherein the organic acid in the acid bath is tartaric acid having a concentration of about 0.02 to about 0.04M.

16. The method of claim 1, wherein the acid bath further includes about 0.03 to about 0.15 vol. % of a surfactant.

17. The method of claim 1, wherein the acid bath further includes up to about 1N sulfuric acid.

18. The method of claim 1, wherein the acid bath further includes up to about 40 boric acid.

19. The method of claim 1, wherein the acid bath further includes aluminum ions.

20. The method of claim 1, wherein the polished glass substrate is immersed in the acid bath for at least about 4 minutes.

21. The method of claim 1, wherein the polished glass substrate is immersed in the acid bath for about 4 minutes to about 5 minutes.

22. The method of claim 1, further comprising scrubbing the polished glass substrate with polyvinyl alcohol pads and potassium hydroxide having a pH of between about 9 and about 12.

23. The method of claim 1, further comprising, after said immersion step, subjecting the polished glass substrate to chemical strenthening, and immersing the polished glass substrate in an etching bath comprising a surfactant and an acid selected from the group consisting of organic acids and sulfuric acid.

24. The method of claim 1, further comprising, after said immersion step, subjecting the polished glass substrate to chemical strenthening, and immersing the polished glass substrate in an etching bath comprising nitric acid, boric acid, hydrogen peroxide and an organic acid having a carboxylic acid group.

25. The method of claim 16, wherein the acid bath includes about 0.1 vol. % of the surfactant.

26. The method of claim 19, wherein the acid bath includes up to about 0.005N $Al(NO_3)_3 \cdot 9H_2O$.

27. The method of claim 22, further comprising immersing the polished glass substrate in a basic bath of potassium hydroxide having a pH of between about 11.5 and about 13 subsequent to the step of immersing the polished glass substrate in the acid bath.

28. A method for cleaning glass substrates after being polished with a slurry comprising lanthanide oxide particles, the method comprising the steps of:
- polishing a glass substrate with a slurry comprising lanthanide oxide particles;
- immersing the polished glass substrate having lanthanide oxide particles thereon in an acid bath comprising at least about 1N nitric acid, a least about 0.15N hydrogen peroxide and at least about 0.0067M tartaric acid; and
- subsequently immersing the polished glass substrate in a basic bath of potassium hydroxide having a pH of between about 11.5 and about 13, wherein the step of immersion in the acid bath substantially dissolves the lanthanide oxide particles from the polished glass substrate into the acid bath thereby reducing the content of the lanthanide oxide particles present on the polished glass substrate.

29. The method of claim 28, wherein the glass substrate is an aluminosilicate glass.

30. The method of claim 28, wherein the lanthanide oxide particles include at least one of lanthanum oxide and cerium oxide.

31. The method of claim 28, wherein he polished glass substrate is immersed in the acid bath at a temperature of at least about 40° C.

32. The method of claim 28, wherein the polished glass substrate is immersed in the acid bath at a temperature of about 55° C. to about 70° C.

33. The method of claim 28, wherein the nitric acid in the acid bath is about 3N to about 4N nitric acid.

34. The method of claim 28, wherein the hydrogen peroxide in the acid bath is about 0.15N to about 1N hydrogen peroxide.

35. The method of claim 28, wherein the organic acid in the acid bath is tartaric acid having a concentration of about 0.02 to about 0.04M.

36. The method of claim 28, wherein the acid bath further includes about 0.03 to about 0.15 vol. % of a surfactant.

37. The method of claim 28, wherein the acid bath further includes up to about 1N sulfuric acid.

38. The method of claim 28, wherein the acid bath further includes up to about 40 g/l boric acid.

39. The method of claim 28, wherein the acid bath further includes aluminum ions.

40. The method of claim 28, wherein the polished glass substrate is immersed in the acid bath for at least about 4 minutes.

41. The method of claim 28, wherein the polished glass substrate is immersed in the acid bath for about 4 minutes to about 5 minutes.

42. The method of claim 28, further comprising scrubbing the polished glass substrate with polyvinyl alcohol pads and potassium hydroxide having a pH of between about 9 and about 12.

43. The method of claim 28, further comprising, after the step of immersion in the basic bath, subjecting the polished glass substrate to chemical strengthening, and immersing the polished glass substrate in an etching bath comprising a surfactant and an acid selected from the group consisting of tartaric acid and sulfuric acid.

44. The method of claim 28, further comprising, after the step of immersion in the basic bath, subjecting the polished glass substrate to chemical strengthening, and immersing the polished glass substrate in an etching bath comprising nitric acid, boric acid, hydrogen peroxide and an organic acid having a carboxylic acid group.

45. The method of claim 36, wherein the acid bath includes about 0.1 vol. % of the surfactant.

46. The method of claim 39, wherein the acid bath includes up to about 0.02N $Al(NO_3)_3 \cdot 9H_2O$.

47. A method for cleaning polished glass substrates comprising the steps of:
- (a) polishing a glass substrate with a slurry comprising oxide particles of lanthanide series elements;
- (b) ultrasonically cleaning the polished glass substrate;
- (c) mechanically scrubbing the polished glass substrate with soap and a pad;
- (d) immersing the polished glass substrate in an acid bath comprising nitric acid, hydrogen peroxide and an organic acid having a carboxylic acid group;
- (e) scrubbing the polished glass substrate with polyvinyl alcohol pads and potassium hydroxide; and
- (f) immersing the polished glass substrate in a basic bath of potassium hydroxide, wherein the step of immersion in the acid bath substantially dissolves the lanthanide series oxide particles from the polished glass substrate into the acid bath thereby reducing the content of the lanthanide series oxide particles present on the polished glass substrate.

48. The method of claim 47, further comprising, after step (f):
- (g) subjecting the polished glass substrate to chemical strengthening;
- (h) immersing the polished glass substrate in an etching bath of a surfactant and an acid selected from the group consisting of organic acids and sulfuric acid;
- (i) repeating step (c); and
- (j) repeating step (f).

49. The method of claim 48, wherein the content of oxide particles of each lanthanide series element on the polished glass substrate less than about $1.52 \times 10^{-4}$ ng/mm$^2$ after step (j).

* * * * *

UNITED STATES PATENT AND TRADEMARK OFFICE
CERTIFICATE OF CORRECTION

PATENT NO. : 6,402,851 B1
DATED : June 11, 2002
INVENTOR(S) : Douglas Howard Piltingsrud It is certified that error appears in the above-identified patent and that said Letters Patent is hereby corrected as shown below:

Column 10,
Line 47, replace "0.5N" with -- 0.15N --.
Line 69, insert -- g/l after "40".

Column 11,
Line 39, replace "a" with -- at --.
Line 54, replace "he" with -- the --.

Column 12,
Line 60, replace "(c)" with -- (e) --

Signed and Sealed this

Twenty-fourth Day of September, 2002

Attest:

Attesting Officer

JAMES E. ROGAN
Director of the United States Patent and Trademark Office